Aug. 14, 1934. B. A. WITTKUHNS ET AL 1,970,442
CONDENSER CONTROLLED FOLLOW-UP SYSTEM
Filed Sept. 25, 1931   2 Sheets-Sheet 1
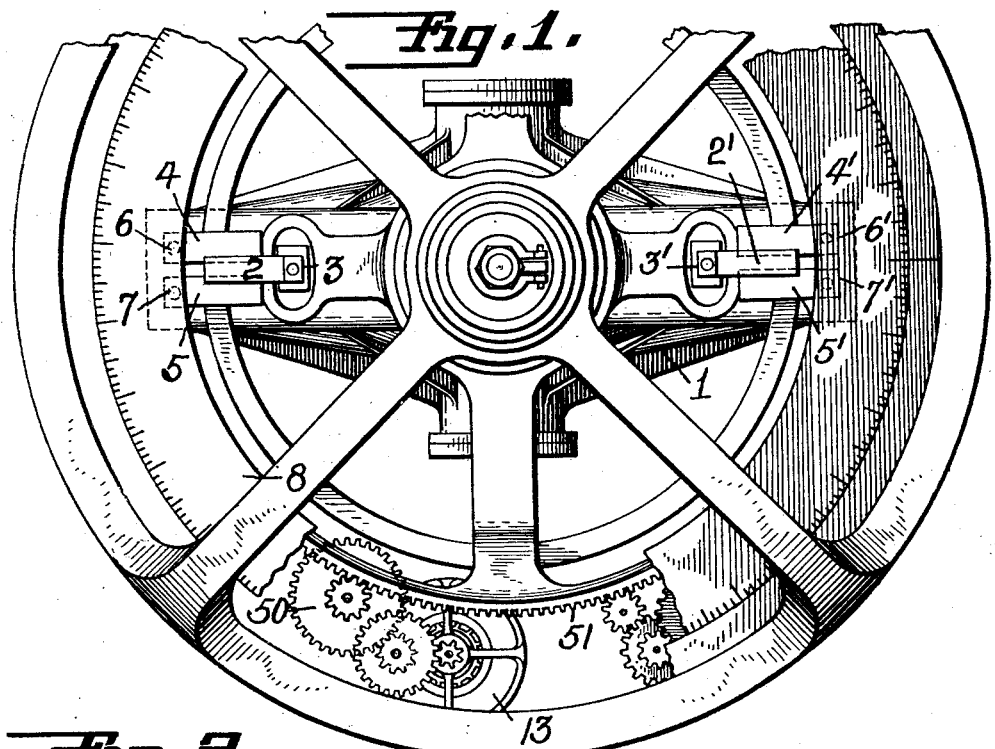
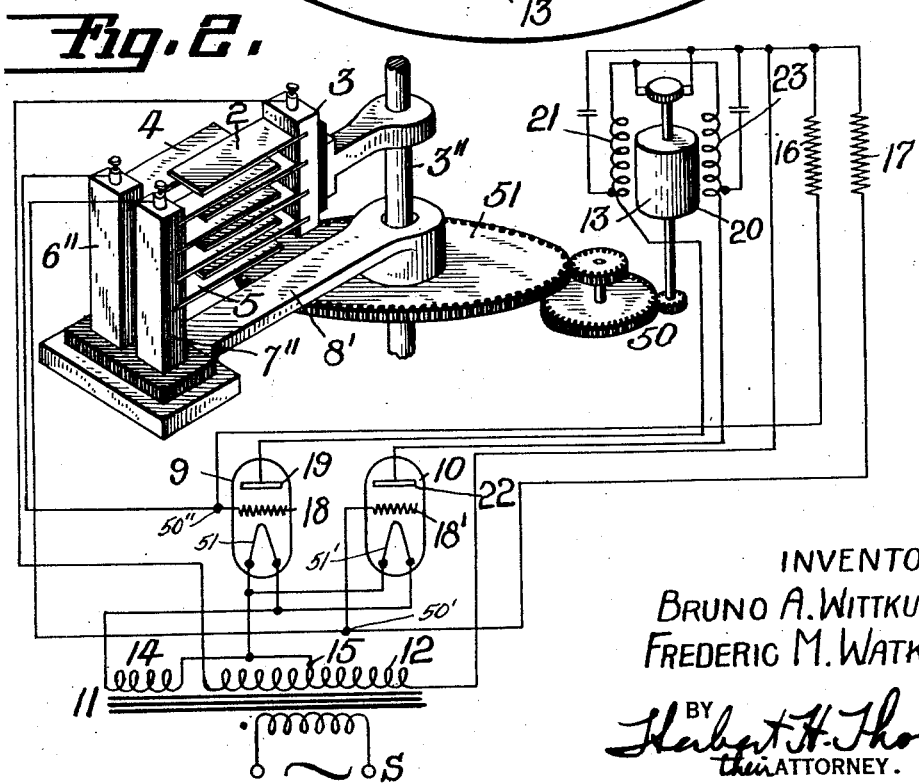
INVENTORS.
BRUNO A. WITTKUHNS.
FREDERIC M. WATKINS.
BY Herbert H. Thompson
their ATTORNEY.

Aug. 14, 1934.  B. A. WITTKUHNS ET AL  1,970,442
CONDENSER CONTROLLED FOLLOW-UP SYSTEM
Filed Sept. 25, 1931  2 Sheets-Sheet 2
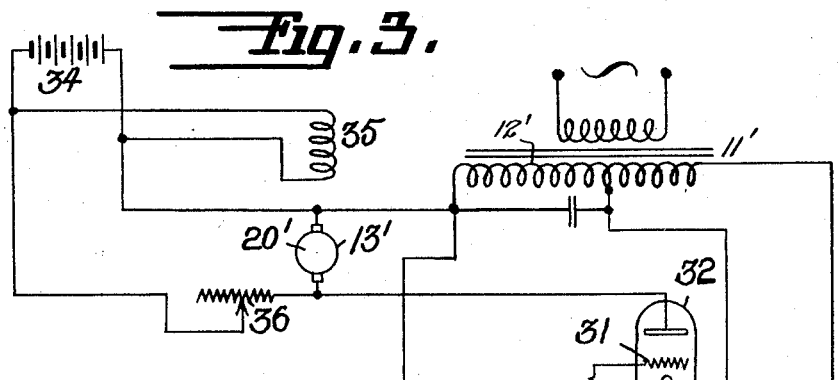
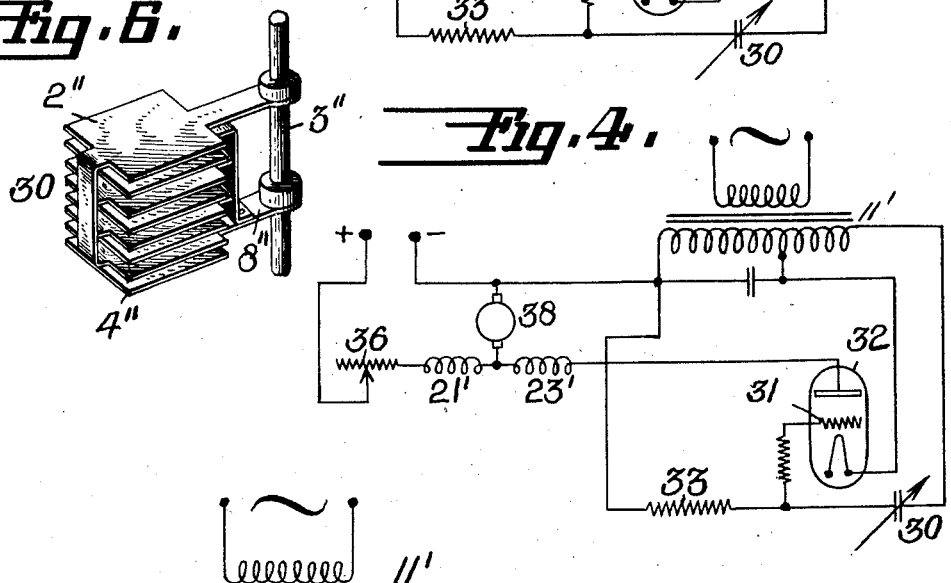
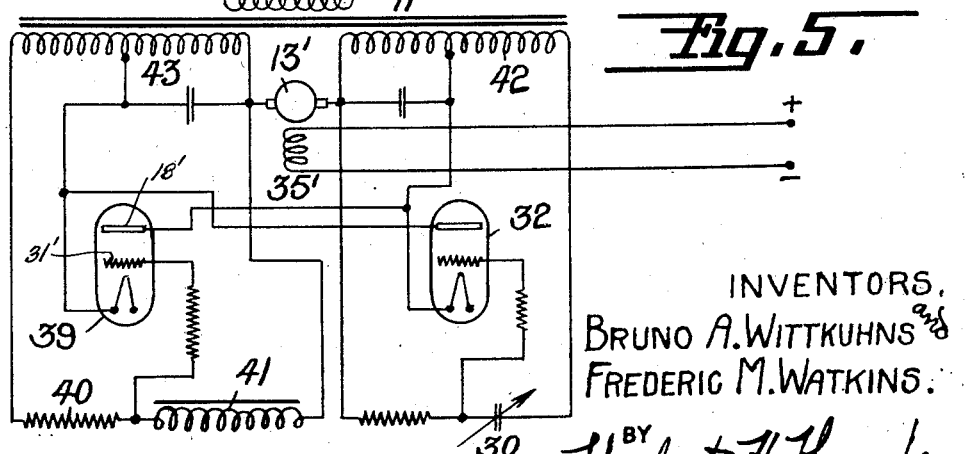
INVENTORS.
BRUNO A. WITTKUHNS and
FREDERIC M. WATKINS.
BY Herbert H. Thompson
their ATTORNEY.

UNITED STATES PATENT OFFICE 1,970,442

CONDENSER CONTROLLED FOLLOW-UP SYSTEM

Bruno A. Wittkuhns, Chatham, N. J., and Frederic M. Watkins, Forest Hills, N. Y., assignors to Sperry Gyroscope Company, Inc., Brooklyn, N. Y., a corporation of New York Application September 25, 1931, Serial No. 565,146

5 Claims. (Cl. 172—239)

This invention relates to motor control by means of grid controlled gas or vapor filled rectifier tubes usually termed "grid-glow" tubes. These tubes are also known as hot cathode grid-controlled rectifiers. While the general appearance of these tubes seems to be more or less like those of three-element thermionic tubes, there is a decided difference in their control. Inasmuch as special means have to be provided to interrupt the D. C. plate current, which otherwise, after the tube has once started, would no longer be subject to the control of the grid, it is in most cases advisable to use A. C. for the plate supply, or, if D. C. is used, provide means to interrupt this D. C. if the tube has to be stopped. The great advantage of these tubes, however, is the possibility of controlling comparatively large amounts of power by means of very small input energies. They, therefore, are excellently suited for use as relays, with the added advantage of no moving parts whatsoever.

In the present invention, these tubes are used to control power driven motors, especially in such cases where the motors not only have to be stopped and started but where they also have to be reversed. Furthermore, this invention relates to the use of such motors in all kinds of apparatus where the controlling element is not able to supply appreciable amounts of either mechanical or electrical energy, as, for instance, in follow-up arrangements for gyro compasses, magnetic compasses, remote control systems, and the like. We are aware that it has been proposed to use such tubes to turn off and on the power supply to a load such as a motor, but in our system a plurality of currents are continuously supplied to the controlled motor and its movements controlled by varying the relative strength thereof.

For use in a follow-up system for sensitive elements, such as gyroscopic apparatus, it is highly essential that the controlling element does not place any load on the sensitive element. We prefer to use as a controlling element in such a system one or more variable condensers, one part of which is placed on the follow-up element and the other on the sensitive element. Alternating current is preferably used as a source of supply for the grid-glow tube or tubes, the output of the tube being controlled by shifting the phase on the grid or grids thereof by means of the above mentioned variable condenser and a resistance or resistances, the output being used to drive or tend to drive the follow-up motor in one direction, while rotation in the other direction is controlled by another source of supply, either fixed or variable.

Referring to the drawings showing several forms that our invention may assume,

Fig. 1 is a plan view of a gyro compass showing how our invention may be employed to actuate the follow-up system thereof.

Fig. 2 is a wiring diagram showing one of our improved methods of control of the follow-up motor.

Fig. 3 is a wiring diagram of a modified form of the invention using only one half the number of gas filled rectifier tubes employed in Fig. 2.

Fig. 4 is a wiring diagram showing a modification of Fig. 3 using a series wound motor with two opposed fields instead of a shunt wound motor.

Fig. 5 is a wiring diagram of still another modification showing two gas filled rectifier tubes but varying the output of only one of the same.

Fig. 6 is a detailed view of the form of variable condenser preferred for use in the diagrams of Figs. 3, 4 and 5.

According to our invention, we employ as the controlling element one or more variable condensers, preferably of a type in which a large change in capacity results from a small movement. As shown in Fig. 1, we mount on the sensitive or gyroscopic element 1 a plurality of spaced plates 2 secured to a post 3 rising from the vertical ring of the sensitive element. Said plates normally lie between two series of parallel plates 4 and 5 secured to posts 6 and 7 on the follow-up element 8. It is quite evident, therefore, that as the plates 2 are rotated clockwise with respect to the plates 4 and 5, for instance, that the capacity of condenser 4 will be increased and that of 5 decreased, while if relative rotation takes place in the other direction the reverse will be true. The follow-up element is rotated by a reversible motor 13 which is geared through reduction gearing 50 to annular gear 51 on said element. If desired, the condensers may be duplicated on the opposite side of the compass as shown at 2', 4' and 5'.

In the wiring diagram plates are shown as secured to a stem post 3" of any controlling element, while condenser plates 4 and 5 are on a post 6" on bracket 8' loosely mounted on shaft 3' and turned from large gear 51 driven from follow-up motor 13. In this instance we prefer to employ a pair of grid-glow tubes 9 and 10 powered from a source of alternating current S. As shown, the power supply is furnished by a transformer 11 having a main winding 12 for supplying the plate potentials and the power to the follow-up motor 13 and an auxiliary winding 14 for lighting the filaments of the tubes. Preferably the winding 12 is center tapped at 15 at which point one end of the secondary winding 14 and one side of the heater circuit for filaments 51, 51' are connected.

There is also placed in series with each condenser a high resistance 16 and 17, the grid 18—18' of each tube being connected to a point (50', 50'') between the resistance and the capacity. The output or plate 19 of tube 9 is connected to the armature 20 of the motor 13 through a series field winding 21, while the plate 22 of the tube 10 is correspondingly connected to the same armature 20 through an oppositely wound field winding 23. One characteristic of this type of tube is that the output may be readily controlled, i. e., stopped, started and varied in magnitude, by using an alternating current supply and by shifting the phase on the grid with respect to the phase on the plate. The tube will then only start when the plate is positive and the grid is positive (or past its initial point), but when started will continue until the plate becomes negative. By shifting the phase relations between the plate and grid, therefore, the mean value of the current passed by a single tube may be varied gradually from zero to approximately full half wave value. The phase on the grid of the tubes is shifted preferably by varying a capacity in series with a fixed resistance forming a resistance-capacity bridge. Since the capacity of the two condensers varies oppositely upon relative movement, the result is that the current through one field coil will increase as the other decreases. By arranging the system so that the currents are normally equal through the two coils, when the tubes are delivering about one half the maximum output, i. e., when the grids and plates are about 90° out of phase, the motor 20 will stand still since there is no field, but upon slight movement in either direction the current in one field will preponderate and start the motor to drive the follow-up system in the proper direction to restore synchronism.

In Fig. 3 a simpler means is employed for driving the follow-up motor. In this case only one variable condenser 30 is employed which may, if desired, assume the form shown in Fig. 6. In order to simplify these diagrams, the filament heating circuit is omitted. In this case the phase on the grid 31 of the tube 32 is again shifted by varying the capacity of the condenser 30 in series with the fixed resistance 33 and the output of the tube is led to the motor 13'. In this case, however, a constant source of D. C. potential is supplied as by means of a battery 34, said battery serving to excite the shunt field 35 and also tending to drive the armature 20' in the opposite direction to tube 32. The strength of the current furnished by the battery 34 to armature 20' may be varied by variable resistance 36 and so adjusted that it just balances the output of the tube 32 when producing its mid output. Therefore, when the output voltage of the tube 32 rises above the voltage furnished by the supply 34 across the terminals of the armature 20', the motor will turn in one direction and when it falls below said voltage the motor will turn in the opposite direction.

Fig. 4 discloses a similar circuit to Fig. 3 except that a series wound motor 38 is employed with two opposed field windings 21' and 23' as in Fig. 1. In this case, however, a constant potential is supplied to one winding, say 21', and the armature, which may be varied through resistance 36 as before, while the tube 32 furnishes the variable potential as in Fig. 3.

Fig. 5 shows a modification in which two grid-controlled tubes are employed but only one variable condenser 30. In this form the tube 32 acts the same as in Figs. 3 and 4. The tube 39, on the other hand, is supplied with a fixed phase grid potential, the grid 31' being connected between a resistance 40 and an inductance 41 to permanently shift the phase on the grid about 90° from the phase on the plate 18' so that the output is about one half that of the maximum output of tube 32. Each tube is supplied with an alternating current from separate secondaries 42—43 on the transformer 11'. Current will, therefore, be supplied at constant potential to the armature 13' of the motor from the tube 39, while the current from the tube 32 will vary above and below said constant potential as the position of condenser 30 varies, thereby actually reversing the current in the armature. By separately exciting the field 35' of said motor, it may be driven in either direction by variations in the capacity of the condenser, as in Figs. 3 and 4. The form shown in Fig. 5 has the advantage, however, that it is unaffected by variations in the voltage or frequency of the supply.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus it is obvious that the circuits in Figs. 2 and 4 may be modified so that the armature is supplied with constant current from a separate source of supply and the field coils only controlled, as anyone familiar with electrical equivalents will readily understand. Likewise, instead of having the double winding on the field, it could be placed on the armature instead.

Having described our invention, what we claim and desire to secure by Letters Patent is:

1. In a remote control or follow-up system for driving a following element from a controlling element, a reversible direct current motor, an alternating current supply, a grid-glow rectifier tube for supplying direct current to said motor, and means for governing both the direction of rotation and torque of the motor including a variable two-part condenser, one part being mounted on the controlling and the other on the following element, and a resistance, for varying the phase on the grid of said tube, and means for supplying said motor with a counter E. M. F. tending to drive it in the opposite direction to said tube output.

2. In a remote control or follow-up system, the combination with a controlling and a follow-up element, a reversible power motor for driving the latter having opposed fields, a grid-glow tube having the output thereof connected to one field, means for supplying the other field with constant potential, an A. C. supply for said tube, and a variable condenser connected between said elements adapted to shift the phase on the grid of said tube in accordance with the relative positions thereof.

3. In a remote control or follow-up system, the combination with a controlling and a follow-up element, a reversible power motor for driving the latter, a pair of grid-glow tubes having the output of one connected to drive the motor in one direction and the output of the other connected to drive the motor in the other direction, a common A. C. supply for said tubes, a variable condenser connected between said elements adapted to shift the phase on the grid of one of said tubes in accordance with the relative positions thereof, and means for supplying the grid of the other tube with a fixed phase.

4. In a remote control or follow-up system for driving a following element from a controlling element, a reversible direct current motor, an alternating current supply, a pair of grid-glow tubes for supplying direct current to said motor, and means for governing both the direction of rotation and torque of the motor including variable condensers mounted so as to be oppositely varied upon relative rotation of the controlling and following elements for varying the phases on the grids of said tubes, the output of said tubes being oppositely connected to said motor to drive the same in either direction dependent on the preponderance of output of either tube or to stand still when the outputs are equal.

5. In a remote control or follow-up system, the combination with a controlling and a follow-up element, a reversible power motor for driving the latter having opposed windings, a pair of grid-glow tubes having the output of one connected to one winding and the output of the other connected to the other winding, a common A. C. supply for said tubes, and variable condensers mounted so as to be oppositely varied upon relative rotation of the controlling and follow-up elements for oppositely shifting the phase on the grids of said tubes upon relative movement of the controlling and follow-up elements.

BRUNO A. WITTKUHNS.
FREDERIC M. WATKINS.